United States Patent
Cao (10) Patent No.: US 11,074,037 B2
(45) Date of Patent: Jul. 27, 2021

(54) VOICE BROADCAST METHOD AND APPARATUS

(71) Applicant: ZTE CORPORATION, Shenzhen (CN)

(72) Inventor: Gang Cao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 143 days.

(21) Appl. No.: 16/320,776

(22) PCT Filed: Feb. 17, 2017

(86) PCT No.: PCT/CN2017/073946
§ 371 (c)(1),
(2) Date: Jan. 25, 2019

(87) PCT Pub. No.: WO2018/018882
PCT Pub. Date: Feb. 1, 2018

(65) Prior Publication Data
US 2019/0163439 A1    May 30, 2019

(30) Foreign Application Priority Data

Jul. 25, 2016 (CN) .......................... 201610590146.5

(51) Int. Cl.
*G06F 3/16* (2006.01)
*G10L 15/28* (2013.01)
(Continued)

(52) U.S. Cl.
CPC .............. *G06F 3/167* (2013.01); *G06F 3/017* (2013.01); *G06F 16/957* (2019.01); *G06F 16/9538* (2019.01); *G06F 16/9577* (2019.01)

(58) Field of Classification Search
CPC ..... G06F 3/167; G06F 16/9538; G10L 15/28; G10L 15/30; G10L 15/32; G10L 15/34
See application file for complete search history.

(56) References Cited

U.S. PATENT DOCUMENTS 8,090,583 B1 * 1/2012 Bangalore ............. G10L 15/193
704/270
8,311,835 B2    11/2012 Lecoeuche
(Continued)

FOREIGN PATENT DOCUMENTS

CN    101325768 A    12/2008
CN    102117317 A     7/2011
(Continued)

OTHER PUBLICATIONS

European Search Report; PCT Application No. PCT/CN2017/073946 ; International Filing Date: Feb. 17, 2017 ; dated May 8, 2019 ; 7 pages.
(Continued)

*Primary Examiner* — Michael N Opsasnick
(74) *Attorney, Agent, or Firm* — Cantor Colburn LLP (57) ABSTRACT

A voice broadcast method includes: generating a voice broadcast instruction when a voice broadcast operation is received; according to the voice broadcast instruction, starting from a current focus node, detecting nodes from a current web page interface, and when a target node is determined, broadcasting text content of the target node, wherein the target node is a node with text information, has no sub-nodes and does not respond to an operation event.

6 Claims, 4 Drawing Sheets

(51) Int. Cl.
*G10L 15/32* (2013.01)
*G06F 16/957* (2019.01)
*G06F 16/9538* (2019.01)
*G06F 3/01* (2006.01)

(56) References Cited

U.S. PATENT DOCUMENTS

| | | | | |
|---|---|---|---|---|
| 2002/0194223 | A1* | 12/2002 | Meyers | G06F 40/211 |
| | | | | 715/234 |
| 2007/0157081 | A1 | 7/2007 | Hara et al. | |
| 2011/0129073 | A1* | 6/2011 | Chaudhuri | H04M 3/4931 |
| | | | | 379/88.16 |
| 2012/0123781 | A1 | 5/2012 | Park et al. | |
| 2013/0117022 | A1* | 5/2013 | Chen | B60K 35/00 |
| | | | | 704/235 |
| 2013/0185081 | A1* | 7/2013 | Cheyer | G10L 15/1815 |
| | | | | 704/275 |
| 2013/0275164 | A1* | 10/2013 | Gruber | G06Q 10/02 |
| | | | | 705/5 |
| 2014/0164352 | A1* | 6/2014 | Denninghoff | H03H 9/25 |
| | | | | 707/711 |
| 2014/0282002 | A1 | 9/2014 | McKiel, Jr. | |
| 2015/0269953 | A1* | 9/2015 | Siami | G10L 21/02 |
| | | | | 704/201 |
| 2015/0314454 | A1* | 11/2015 | Breazeal | B25J 9/0003 |
| | | | | 700/259 |
| 2016/0173578 | A1* | 6/2016 | Sharma | G06F 3/167 |
| | | | | 709/203 |
| 2016/0269508 | A1* | 9/2016 | Sharma | G06F 40/30 |
| 2016/0292276 | A1* | 10/2016 | Denninghoff | G06F 3/04842 |

FOREIGN PATENT DOCUMENTS

| | | |
|---|---|---|
| CN | 103188316 A | 7/2013 |
| CN | 103853355 A | 6/2014 |

OTHER PUBLICATIONS

International Search Report issued in International Application No. PCT/CN2017/073946, dated May 24, 2017; 5 pages.
CN Office Action; dated Apr. 27, 2021; Application No. 201610590148. Filed: Jul. 25, 2016; 8 pages.
CN Search Report; dated Apr. 19, 2021: Application No. 201610590146.5; Filed: Jul. 25, 2016; 4 pages.

* cited by examiner

VOICE BROADCAST METHOD AND APPARATUS

CROSS REFERENCE

This application is the 371 application of PCT Application No. PCT/CN2017/073946 filed Feb. 17, 2017, which is based upon and claims priority to Chinese Patent Applications No. 201610590146.5, filed on Jul. 25, 2016, the entire contents thereof are incorporated herein by reference.

TECHNICAL FIELD

The present disclosure relates to the field of communication technologies, and more particularly, to a voice broadcast method and apparatus.

BACKGROUND

National law of the North American requires that terminal devices such as mobile phones must support voice assist function used by disable people, such as the TALKBACK voice broadcast assist function developed by Google. The voice function can automatically broadcast the name or content of the control touched by user through the gesture performed on the screen of the mobile phone by the blind user. However, conventional technologies on mobile phones have various problems in supporting these voice assist function currently. For example, for a pure button mobile phone, it is very difficult to support the voice assist function in the browser for browsing on the Internet, because the content of each node in the webpage Document Object Model (DOM) can be broadcasted automatically and sequentially by slide with two-finger on the touch screen, and only the focused elements can be broadcasted in the form of voice depend on the guide of directional buttons on button mobile phones.

However, there are conflicting functions between the voice broadcast and the guide of directional buttons on button mobile phones, because directional buttons on button mobile phones can only focus on the focusable elements on the webpage (such as links, input boxes, buttons, etc.), so that it will miss a lot of voice broadcast of the content information of the non-focusable elements depend on the guide by the button. Therefore, a technical solution for voice broadcast is urgently needed, which can solve the problem that content information of many non-focusable elements is missed in the process of the voice broadcast in the prior art.

This section provides background information related to the present disclosure which is not necessarily prior art.

SUMMARY

In view of this, embodiments of the present disclosure are related to a voice broadcast method and apparatus, which at least solves the problem of missing content information of many non-focusable elements in the process of the voice broadcast.

The technical solution of the embodiment of the present disclosure is implemented in this way.

An embodiment of the present disclosure is to provide a voice broadcast method. A voice broadcast method, including: generating a voice broadcast instruction when a voice broadcast operation is received; searching for a node from a current focused node on a current webpage interface based on the voice broadcast instruction; when the node is a target node, broadcasting text content of the target node; wherein the target node has text information, has no subnode and does not respond to an operation event.

In the above solution, before the broadcasting text content of the target node, the method further includes: determining, when the node does not respond to an operation event, the node is a non-focusable node; determining, when the non-focusable node is a node element without including a subnode in a webpage document object model DOM, the node is a leaf node; determining a text length of the leaf node; and determining, when the text length of the leaf node is greater than a preset length threshold, the node as the target node.

In the above solution, before broadcasting text content of the target node, the method further includes: detecting a size of content to be broadcasted of the target node; and performing corresponding node reconstruction process on the target node according to the size of the content to be broadcasted of the target node.

In the above solution, the performing corresponding node reconstruction process on the target node according to the size of the content to be broadcasted of the target node includes: performing, when the size of the content to be broadcasted of the target node does not reach a first preset range, a merge process on the target node, and using the merged content to be broadcasted as the text content; acquiring, when the size of the content to be broadcasted of the target node falls within the first preset range, the content to be broadcasted of the target node, and using the content to be broadcasted as the text content; performing, when the size of the content to be broadcasted of the target node exceeds the first preset range, segmentation process on the target node, and using the content to be broadcasted after the segmentation process as the text content.

In the above solution, the performing a merge process on the target node includes: searching for a node to be merged of the target node sequentially from the target node, wherein the node to be merged is a sibling node of the target node having text information and having no subnode; merging, when the node to be merged has a same element label as the target node, the target node with the node to be merged to obtain a merged node; detecting whether a size of content to be broadcasted of the merged node reaches the first preset range; and keeping searching, when the size of the content to be broadcasted of the merged node does not reach the first preset range, for a next node to be merged having the same element label with the target node, until the size of the content to be broadcasted of the merged node reaches the first preset range or there is no node to be merged having the same element label as the target node.

An embodiment of the present disclosure is to provide a voice broadcast apparatus. The apparatus comprises a receiving unit, a search unit and a broadcast unit; the receiving unit, configured to generate a voice broadcast instruction when a voice broadcast operation is received; the search unit, configured to search for a node from a current focused node on a current webpage interface based on the voice broadcast instruction; the broadcast unit, configured to broadcast, when the node is a target node, text content of the target node; wherein the target node has text information and has no subnode and does not respond to an operation event.

In the above solution, the apparatus further includes a determination unit configured to determine, when that the node does not respond to an operation event, the node is a non-focusable node; determine, when the non-focusable node is a node element without including a subnode in a webpage document object model DOM, the node is a leaf node; determine a text length of the leaf node; and determine, when the text length of the leaf node is greater than a preset length threshold, the node as the target node.

In the above solution, the apparatus further includes a detection unit and a reconstruction unit, the detection unit, configured to detect a size of content to be broadcasted of the target node; and the reconstruction unit, configured to perform corresponding node reconstruction process on the target node according to the size of the content to be broadcasted of the target node.

In the above solution, the reconstruction unit includes a merging module, a direct broadcast module and a segmentation module; the merging module, configured to perform, when the size of the content to be broadcasted of the target node does not reach a first preset range, a merge process on the target node, and using the merged content to be broadcasted as the text content; the direct broadcast module, configured to acquire, when the size of the content to be broadcasted of the target node falls within the first preset range, the content to be broadcasted of the target node, and use the content to be broadcasted as the text content; the segmentation module, configured to perform, when the size of the content to be broadcasted of the target node exceeds the first preset range, segmentation process on the target node, and use the content to be broadcasted after the segmentation process as the text content.

In the above solution, the merging module further configured to search, when the size of the content to be broadcasted of the target node does not reach the first preset range, for a node to be merged of the target node sequentially from the target node, wherein the node to be merged is a sibling node of the target node having text information and having no subnode; merge, when the node to be merged has a same element label as the target node, the target node with the node to be merged to obtain a merged node; detect whether a size of content to be broadcasted of the merged node reaches the first preset range; and keep searching, when the size of the content to be broadcasted of the merged node does not reach the first preset range, for a next node to be merged having the same element label with the target node, until the size of the content to be broadcasted of the merged node reaches the first preset range or there is no node to be merged having the same element label as the target node.

A method for voice broadcast according to an embodiment of the present disclosure includes: generating a voice broadcast instruction when a voice broadcast operation is received; searching for a node from a current focused node in a current webpage interface according to the voice broadcast instruction; When the node is a target node, broadcasting the text content of the target node; wherein the target node has text information and has no subnode. When the voice broadcast operation is received, a node having text information and no subnode is searched for from the current focus node on the current webpage interface, the target node is searched for, and text content of the target node is broadcasted. The method provided by the embodiment of the present disclosure can solve the problem that the text information of many unfocused elements is missed in the process of the voice broadcast in the prior art, and the complete broadcast of all the content to be broadcasted is guaranteed during the voice broadcast.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings described herein are intended for providing further understanding of the present disclosure, and constituting a part of the present disclosure. The exemplary embodiments of the present disclosure and description thereof are intended for explaining the present disclosure, but not for constituting an improper limitation on the present disclosure. In the drawings.

DETAILED DESCRIPTION

The implementation of the technical solution will be further described in detail below with reference to the accompanying drawings.

Embodiment 1

Figure 1:
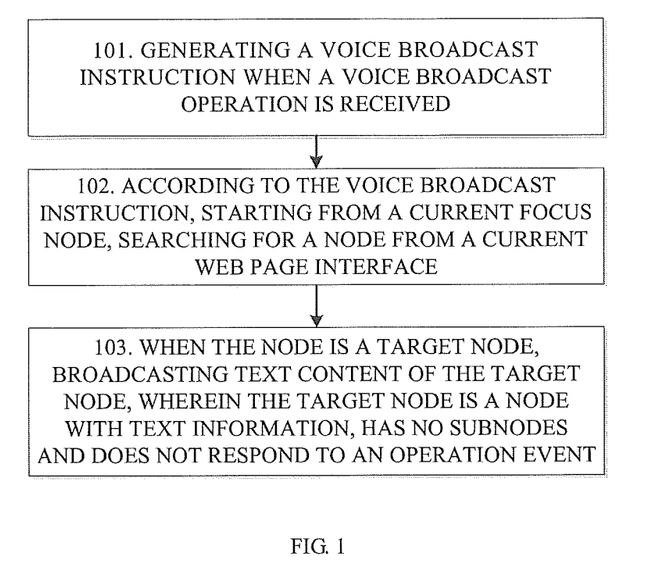
FIG. 1 is a schematic flowchart illustrating a voice broadcast method according to the first embodiment of the present disclosure.

An embodiment of the present disclosure is to provide a voice broadcast method. Referring to FIG. 1, the method includes steps S101-S103.

Step S101, a voice broadcast instruction is generated when a voice broadcast operation is received.

Specifically, when a terminal receives a voice broadcast operation of the terminal from user; the voice broadcast instruction is generated based on the trigger of the voice broadcast operation. Here, the terminal may include a terminal having a touch screen to receive a touch operation from user, a terminal performing a control operation on the terminal through a function button, and a terminal performing a control operation by voice. There is no any restriction on the type of the specific terminal, as long as it can receive user actions.

Here, when the terminal receives the operation from user, it is determined whether the received operation is consistent with the preset voice broadcast operation, and when it is consistent, it is determined that the voice broadcast operation is received. The specific form of the voice broadcast operation is not limited, such as, the upper button in the directional buttons of the button terminal, sliding at dual touch points on the touch screen terminal, the operation of the preset track received by the touch screen terminal, or a preset voice, etc., which can be configured by the system or set by the user.

Step 102, a node is searched for from a current focused node on a current webpage interface based on the voice broadcast instruction.

When the terminal generates a voice broadcast instruction, the voice broadcast process triggered by the user is determined, and at this time, a node is searched for from a focused node on a current webpage interface. Here, the webpage interface may be a webpage interface of the browser, such as a UC, or a webpage interface of an application installed on the terminal, such as a NetEase news APP. The current focused node is the action point on the current user interface. For example, when the received voice broadcast operation is a touch screen operation, at this time, the focused node receives the point corresponding to the coordinates of the touch screen operation; when the received voice broadcast operation is a button operation, the action point of the last operation before this operation can be used as the current focused point. Here, the first node of the webpage interface may also be used as the current focused point when the voice broadcast operation is received, and when the voice broadcast operation is received, the node is searched for from the first node on the webpage interface. Here, the current focused node can be set as needed.

Here, when the terminal generates a voice broadcast instruction, the current focused node is corresponding to the coordinate corresponding to the last operation before the voice broadcast operation is received by the terminal.

It should be noted that the structure of the webpage can be parsed according to the DOM and the node tree, and each component in the hypertext markup language (HTML) document of the webpage is a node. The entire document of a webpage is a document node, each HTML tag is an element node, and text contained in the HTML element is a text node. Each HTML attribute is an attribute node, and an annotation belongs to an annotation node. Nodes have a hierarchical relationship to each other. All nodes in the HTML document make up a document tree (or node tree). Each element, attribute, text, etc. in the HTML document represents a node in the tree. The tree starts at the document node and continues to extend the branches until it reaches all the text nodes at the lowest level of the node tree.

Step S103, when the node is a target node, text content of the target node is broadcasted; wherein the target node has text information, has no subnode and does not respond to an operation event.

wherein, before text content of the target node is broadcasted, the method further includes: determining, when the node does not respond to an operation event, the node is a non-focusable node; determining, when the non-focusable node is a node element without including a subnode in a webpage document object model DOM, the node is a leaf node; determining a text length of the leaf node; and determining, when the text length of the leaf node is greater than a preset length threshold, the node as the target node.

When the terminal receives the voice broadcast instruction, the node elements in the webpage DOM tree are searched for, wherein the node elements include focusable node elements and non-focusable node elements. Here, it is determined whether the node is the focusable node or the non-focusable node based on element label of the node;

Wherein the element label of the focusable node includes A, INPUT and BUTTON, etc., and the corresponding node element is a link, an input box or a button, etc., which needs to respond to an operation event, and the operation event is a user event such as a click event. Here's an example of a link, for the link, when a user's click is received, the webpage needs to be redirected to the webpage corresponding to the link in response to the user's click event. When a node is not a focusable node, it may be determined that the node is a non-focusable node, and the non-focusable node does not respond to user's operation event. For example, a node displays a snippet of text, when user action on this snippet of text is received, the display content of the text remains unchanged and does not respond to received user actions.

When a non-focusable node is identified in the DOM tree of the webpage, it is determined whether the node has a subnode. When the node does not have a subnode, it indicates that the node is a leaf node in the DOM tree, the leaf node is the last level node in the DOM tree, which only have a parent node or a sibling node, and no subnode. The parent node having a subnode is a structure node, and broadcast is not required.

When it is determined that a non-focusable node is a leaf node, a text length of the leaf node is obtained, when the text length is greater than a length threshold, it is determined that the node has text information, does not have a subnode and does not respond to an operation event, i.e., a target node.

The innerText attribute value of the node can be obtained, and the innerText attribute value is corresponding to the text information of the node can be displayed. When the text length of the attribute value is greater than a length threshold, the text length of the node is greater than the length threshold. The length threshold may be zero, or may be other minimum lengths for defining the text to be broadcasted in the form of voice, and the value may be set according to actual needs. When the text length is greater than zero, it indicates that the node to be broadcasted has the displayed text information. When the text length is greater than a value, it indicates that the text information displayed by the node to be broadcasted is greater than the value.

When it is determined that a node is the target node, the text content of the node is sent to the voice assist interface, where the voice assist broadcast interface is a bridge between the browser or application to which the webpage belongs and the voice assist application of the mobile phone system (such as GOOGLE's TALKBACK). It sends the content of the current target node to the voice assist application for real-time voice broadcast, and realizes the voice broadcast of the text content of the target node.

In the embodiment of the present disclosure, before the text content of the target node is broadcasted, the method further includes: detecting a size of content to be broadcasted of the target node; and performing corresponding node reconstruction process on the target node according to the size of the content to be broadcasted of the target node. Specifically, the processing is different according to the size of the broadcast content.

When the size of the content to be broadcasted of the target node does not reach a first preset range, a merge process is performed on the target node, and the merged content to be broadcasted is used as the text content.

When the size of the content to be broadcasted of the target node falls within the first preset range, the content to be broadcasted of the target node is acquired, and the content to be broadcasted is used as the text content.

When the size of the content to be broadcasted of the target node exceeds the first preset range, segmentation process is performed on the target node, and the content to be broadcasted after the segmentation process is used as the text content.

The size of the content to be broadcasted may include a parameter for measuring how much the content to be broadcasted, such as the length of the text to be broadcasted, the layout height of the node, and the like, wherein the layout height is the content pixel height occupied by the node in the actual webpage after the webpage layout is completed. The node reconstruction process corresponding to the target node according to the size of the content to be broadcasted is described by taking the layout height as the size of the content to be broadcasted as an example. The node reconstruction processing herein includes outputting the text content of the target node directly without processing, performing the segmentation processing to output the text content of the segmented node after segmentation, and performing the merge processing to output the merged text content of the merged node.

When the first preset range is (aH/10, aH), wherein H is the screen pixel height of the mobile terminal, a is a coefficient having a value of 1 to 1.5, and h is a layout height of the target node. When aH/10<h<aH, it indicates that the layout height of the target node falls within the first preset range, and the height of the target node is considered to be modest, and the text content of the target node is directly outputted to the voice assist interface as the content to be broadcasted. When h>aH, it indicates that the layout height of the target node exceeds the first preset range, and the size of the content to be broadcasted is relatively large. At this time, the segment process is performed on the content of the target node to be broadcasted, and the content of the target node to be broadcasted is segmented into a plurality of segmented nodes, wherein the content to be broadcasted of each segmented node falls within the range of (aH/10, aH), so that the content to be broadcasted of the node with large size content is segmented into the plurality of segmented nodes with modest height for voice broadcast. The content to be broadcasted of the segmented node is sent to the voice assist interface in sequence. In this case, the voice broadcast of the plurality of segmented nodes may be sequentially performed according to the order of the segmentation. When h<aH/10, it indicates that the layout height of the target node does not reach the first preset range, and the size of the content to be broadcasted is relatively too small. At this time, the merge process is performed on the target node, and the content to be broadcasted of the target node is merged with the content to be broadcasted of the node to be merged, so that the merged node has a modest height, that is, the size of the content to be broadcasted of the merged node is modest, and the content to be broadcasted of the merged node is sent to the voice assist interface for voice broadcast.

When the content to be broadcasted of the target node does not reach the first preset range, the node to be merged of the target node is sequentially searched for from the target node, wherein wherein the node to be merged is a sibling node of the target node having text information and having no subnode; when the node to be merged has a same element label as the target node, the target node is merged with the merged node to obtain a merged node; it is detected whether a size of the content to be broadcasted of the merged node reaches the first preset range; and when the size of the content to be broadcasted of the merged node does not reach the first preset range, a next node to be merged having the same element label with the target node is kept searching for, until the size of the content to be broadcasted of the merged node reaches the first preset range or there is no node to be merged having the same element label as the target node. The number of the nodes to be merged is determined according to the size of the content to be broadcasted by the node to be merged, so that the size of the content to be broadcasted of the merged node falls within a second preset range, where the first preset range and the second preset range can be the same or different, specifically, and it can be adjusted according to actual needs. The node to be merged is a sibling node having the same parent node as the target node, and has a same element label as the target node, and the element label may include <p>, <div> and <h3>, etc., for example, When the element label of the target node is <p>, the element label of the node to be merged is also <p>.

According to the voice broadcast method provided by the embodiment of the present disclosure, on the one hand, the non-focusable element, that is, the virtual focusable node, that can support the voice broadcast is determined according to determination of the leaf node and innerText attribute value, thereby avoiding the button focusing on the button machine to miss the node containing the text information for voice broadcast, and the voice broadcast of some unnecessary nodes will be removed, so as to achieve the purpose of eliminating noise. The problem of missing the text information of many unfocused elements in the voice broadcast in the prior art can be solved, and the complete broadcast of all the content to be broadcasted is guaranteed in the process of the voice broadcast. On the other hand, in the process of node dynamic reconstruction for non-focusable node, dynamic node segmentation or merge process is performed by determining whether the content to be broadcasted of the node is too large or too small. Excessive content is avoided to the disadvantage of replay for the blind when the content is too large, and frequent operation of broadcasts is avoided when the content is too small. Therefore, the method for voice broadcast provided by the embodiment of the present disclosure can well support the blind's webpage navigation experience of voice assist functions on various types of terminals, and has high technical value and commercial value.

Embodiment 2

Figure 2:
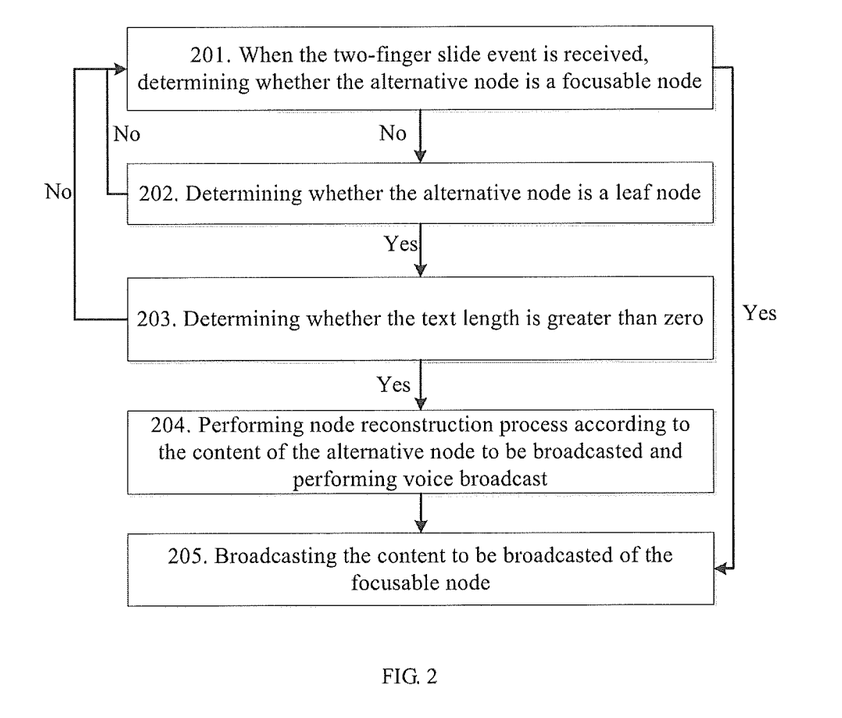
FIG. 2 is a schematic flowchart illustrating a voice broadcast method according to the second embodiment of the present disclosure.

In the second embodiment of the present disclosure, the voice broadcast method provided by the embodiment of the present disclosure is described in the case where the search of the target node is triggered by the slide with two-finger. Referring to FIG. 2, the method includes steps S201-S205.

Step S201, when the two-finger slide event is received, it is determined whether the alternative node is a focusable node.

When the mobile terminal receives the user's two-finger slide operation, it is determined that the voice broadcast request is received. At this time, according to the two-finger slide event inputted by the user, the next focusable alternative node supporting voice broadcast is sequentially searched from the current focused node in the webpage DOM tree. When the alternative node is found, it is determined whether the alternative node is a regular focusable node (ie, a focusable node), and if it is, the process goes to S205 for process, otherwise, it goes to step S202. Here, the conventional focusable node mainly includes nodes whose elements are labeled A (link), INPUT (input box), BUTTON (button), etc., and these nodes are elements that need to be processed in response to user events, so they are called regular focusable nodes; When a node is not a conventional focusable node, it is determined that the node is a non-focusable node.

Step S202, it is determined whether the alternative node is a leaf node.

It is determined whether the alternative node is a leaf node in the webpage DOM tree, and if it is, the process goes to step S203 for process, otherwise it reenters step S201 and then the next alternative node is searched for and the focused node process is performed. The leaf node in the DOM tree here means that the node has no subnode element.

Step S203, it is determined whether the text length is greater than zero.

The innerText attribute value of the alternative node is obtained. If the text length of the attribute value is greater than zero, the process goes to step S204, the alternative node is the target node searched for, otherwise the process goes to step S201 and then the next alternative focused node is searched for. Here the node's innerText attribute value corresponds to the text information that the node can display.

Step S204, node reconstruction process is performed according to the content of the alternative node to be broadcasted and voice broadcast is performed.

The alternative node is set as a virtual focusable node (ie, a target node), and the size of the content to be broadcasted by the virtual focusable node is acquired, node reconstruction process is performed on the virtual focusable node, the content to be broadcasted of the processed node is sent to the voice assisted interface, and the content to be broadcasted is sent to the voice assist application through the voice assist interface for real-time voice broadcast.

Step S205, the content to be broadcasted of the focusable node is broadcasted.

The content to be broadcasted of the conventional focusable node is directly outputted to the voice assist interface, and the content to be broadcasted is sent to the voice assist application through the voice assist interface for real-time voice broadcast.

Embodiment 3

Figure 3:
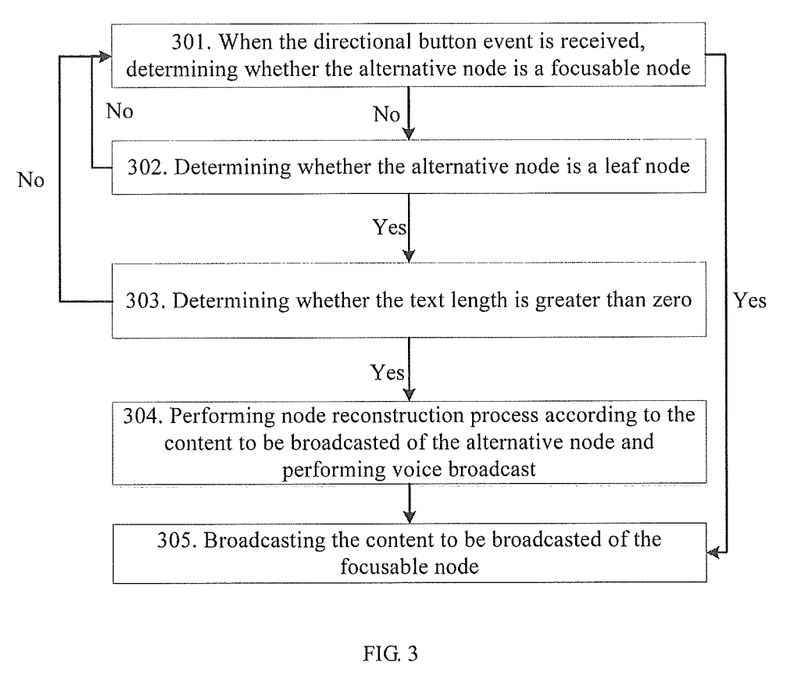
FIG. 3 is a schematic flowchart illustrating a voice broadcast method according to the third embodiment of the present disclosure.

In the third embodiment of the present disclosure, the voice broadcast method provided by the embodiment of the present disclosure is described in the case where the user presses the directional button to trigger the search of the target node in the pure button terminal, but the user presses the directional button, and the terminal receives the directional button event. Referring to FIG. 3, the method includes steps S301-S305.

Step S301, when the directional button event is received, it is determined whether the alternative node is a focusable node.

When the mobile terminal receives the user's directional button operation, it is determined that the voice broadcast request is received. At this time, according to the directional button event pressed by the user, the next focusable alternative node supporting voice broadcast is sequentially searched from the current focused node in the webpage DOM tree. When the alternative node is found, it is determined whether the alternative node is a regular focusable node (ie, a focusable node), and if it is, the process goes to step S305 for process, otherwise, it goes to step S302. Here, the conventional focusable node mainly includes nodes whose elements are labeled A (link), INPUT (input box), BUTTON (button), etc., and these nodes are elements that need to be processed in response to user events, so they are called regular focusable nodes; When a node is not a conventional focusable node, it is determined that the node is a non-focusable node.

Step S302, it is determined whether the alternative node is a leaf node.

It is determined whether the alternative node is a leaf node in the webpage DOM tree, and if it is, the process goes to step S303, otherwise it reenters step S301 and then the next alternative node is searched for and the focused node process is performed. The leaf node in the DOM tree here means that the node has no subnode element.

Step S303, it is determined whether the text length is greater than zero.

The innerText attribute value of the alternative node is obtained. If the text length of the attribute value is greater than zero, the process goes to step S204, the alternative node is the target node searched for, otherwise the process goes to step S201 and then the next alternative focused node is searched for. Here the node's innerText attribute value corresponds to the text information that the node can display.

Step S304, node reconstruction process is performed according to the content to be broadcasted of the alternative node and voice broadcast is performed.

The alternative node is set as a virtual focusable node (ie, a target node), and the size of the content to be broadcasted by the virtual focusable node is acquired, node reconstruction process is performed on the virtual focusable node, the content to be broadcasted of the processed node is sent to the voice assist interface, and the content to be broadcasted is sent to the voice assist application through the voice assist interface for real-time voice broadcast.

Step S305, the content to be broadcasted of the focusable node is outputted directly to the voice assist interface, and the content to be broadcasted is sent to the voice assist application through the voice assist interface for real-time voice broadcast.

It should be noted that, according to the voice broadcast method in the second embodiment and the third embodiment, the process of the target node searched for in the voice broadcast method provided by the embodiment of the present disclosure is applicable to various terminal devices, except that the input trigger mode is different. The other steps are handled exactly the same. Therefore, the method for performing voice broadcast provided by the embodiment of the present disclosure is not limited to the manner in which the physical button operation instruction is triggered or the gesture instruction action on the touch screen, and other input instruction actions such as voice.

Embodiment 4

Figure 4:
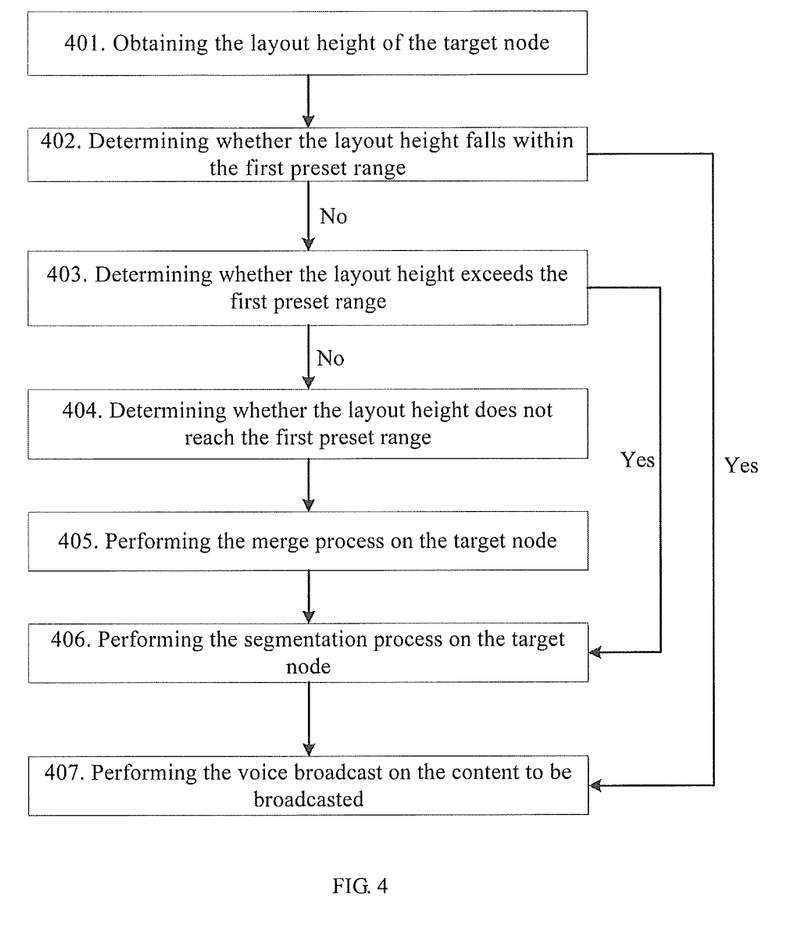
FIG. 4 is a schematic flowchart illustrating a node reconstruction method according to the fourth embodiment of the present disclosure.

In the fourth embodiment of the present disclosure, the method for reconstructing a node in the method for voice broadcast provided by the embodiment of the present disclosure is specifically described. Here, the size of the content to be broadcasted is the layout height, and the first preset range is (aH/10, aH) as an example to explain the node reconstruction method. Referring to FIG. 4, the node reconstruction method includes steps S401-S407.

Step 401, the layout height of the target node is obtained.

Specifically, the layout height of the virtual focusable node (target node) is recorded as h, and the layout height refers to the content pixel height occupied by the node in the actual webpage after the webpage layout is completed; the obtained layout height h is matched to the first preset range.

Step 402, it is determined whether the layout height falls within the first preset range.

Specifically, if the layout height h of the virtual focusable node satisfies the following conditional expression (1).

$$aH/10 < h < aH \qquad (1)$$

It is considered that the height is modest and the process goes to step S406, otherwise it goes to step S403. Here H is the screen pixel height of the terminal device, a is a constant coefficient, and may be 1 or 1.5.

Step 403, it is determined whether the layout height exceeds the first preset range.

Specifically, if the layout height h of the virtual focusable node satisfies the following conditional expression (2).

$$h > aH \quad (2)$$

It is considered that the height is too large and the process goes to step S406, otherwise it goes to step S404.

Step 404, it is determined whether the layout height does not reach the first preset range.

Specifically, if the layout height h of the virtual focusable node satisfies the following conditional expression (3).

$$h < aH/10 \quad (3)$$

It is considered that the height is too small and the process goes to step S405.

Step 405, the merge process is performed on the target node.

It is determined that the next node of the virtual focusable node is also a virtual focusable node. The node has the same element label and the same parent node as the target node, and the virtual next node is the node to be merged, and the node to be merged is merged into the current focused node in the DOM tree and the process goes to S401 again; otherwise, the process goes to step S407;

Step 406, the segmentation process is performed on the target node.

The virtual focusable node is segmented into each new virtual focusable node that satisfies the conditional expression (1), that is, a segmented node (also referred to as a split node), and the first segmented node is used as the current virtual focusable node, the process goes to step S407;

Step 407, the voice broadcast is performed on the content to be broadcasted.

The content to be broadcasted of the current virtual focusable node is sent to the voice assist interface, and the content to be broadcasted is sent to the voice assist application through the voice assist interface for real-time voice broadcast.

It should be noted that, in the steps S401-S404, the layout height is sequentially compared to the first preset range. In an actual application, the corresponding node reconstruction process is performed according to the relationship between the layout height and the first preset range.

Embodiment 5

Figure 5:
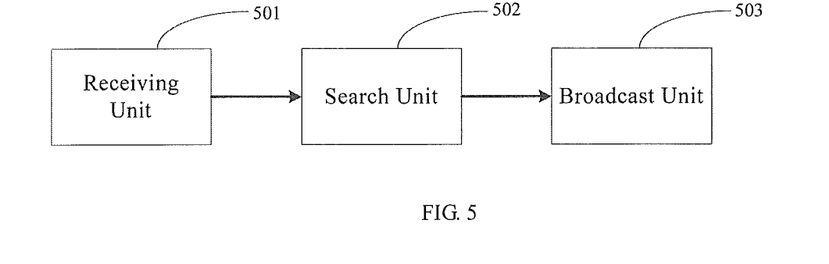
FIG. 5 is a schematic structure diagram illustrating a voice broadcast apparatus according to the fifth embodiment of the present disclosure.

In order to implement the voice broadcast method, the fifth embodiment of the present disclosure provides an apparatus for voice broadcast. Referring to FIG. 5, the apparatus includes a receiving unit 501, a search unit 502 and a broadcast unit 503.

The receiving unit 501 is configured to generate a voice broadcast instruction when a voice broadcast operation is received.

The search unit 502 is configured to search for a node from a current focused node on a current webpage interface based on the voice broadcast instruction.

The broadcast unit 503 is configured to broadcast, when the node is a target node, text content of the target node; wherein the target node has text information and has no subnode and does not respond to an operation event.

Figure 6:
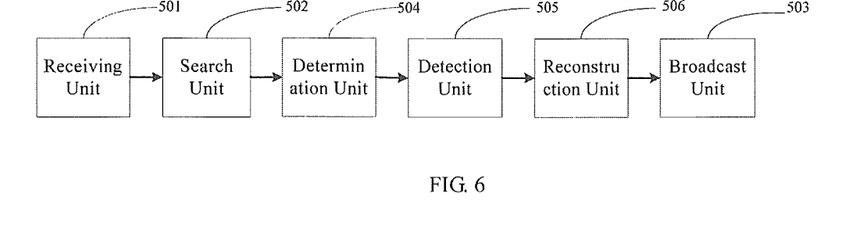
FIG. 6 is a schematic structure diagram illustrating another voice broadcast apparatus according to the fifth embodiment of the present disclosure.

Referring to FIG. 6, the voice broadcast apparatus further includes a determination unit 504, configured to determine, when that the node does not respond to an operation event, the node is a non-focusable node, determine, when the non-focusable node is a node element without including a subnode in a webpage document object model DOM, the node is a leaf node; determine a text length of the leaf node; and determine, when the text length of the leaf node is greater than a preset length threshold, the node as the target node.

Referring to FIG. 6, the voice broadcast apparatus includes a detection unit 505 and a reconstruction unit 506. The detection unit 505 is configured to detect a size of content to be broadcasted of the target node; and the reconstruction unit 506 is configured to perform corresponding node reconstruction process on the target node according to the size of the content to be broadcasted of the target node.

Figure 7:
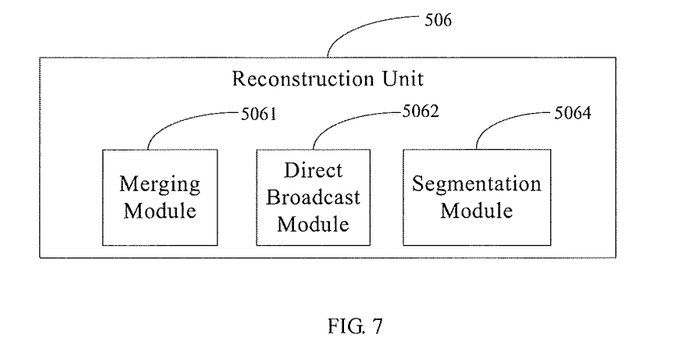
FIG. 7 is a schematic structure diagram illustrating a reconstruction unit according to the fifth embodiment of the present disclosure.

Referring to FIG. 7, the reconstruction unit 506 includes a merging module 5061, a direct broadcast module 5062 and a segmentation module 5063;

The merging module 5061 is configured to perform, when the size of the content to be broadcasted of the target node does not reach a first preset range, a merge process on the target node, and using the merged content to be broadcasted as the text content.

The direct broadcast module 5062 is configured to acquire, when the size of the content to be broadcasted of the target node falls within the first preset range, the content to be broadcasted of the target node, and use the content to be broadcasted as the text content.

The segmentation module 5063 is configured to perform, when the size of the content to be broadcasted of the target node exceeds the first preset range, segmentation process on the target node, and use the content to be broadcasted after the segmentation process as the text content.

The merging module 5061 is specifically configured to search for, when the size of the content to be broadcasted of the target node does not reach a first preset range, a node to be merged of the target node sequentially from the target node, wherein the node to be merged is a sibling node of the target node having text information and having no subnode; merge, when the node to be merged has a same element label as the target node, the target node with the node to be merged to obtain a merged node; detect whether a size of content to be broadcasted of the merged node reaches the first preset range. And keep searching for, when the size of the content to be broadcasted of the merged node does not reach the first preset range, a next node to be merged having the same element label with the target node, until the size of the content to be broadcasted of the merged node reaches the first preset range or there is no node to be merged having the same element label as the target node. The merged content to be broadcasted is taken as the text content.

Embodiment 6

Figure 8:
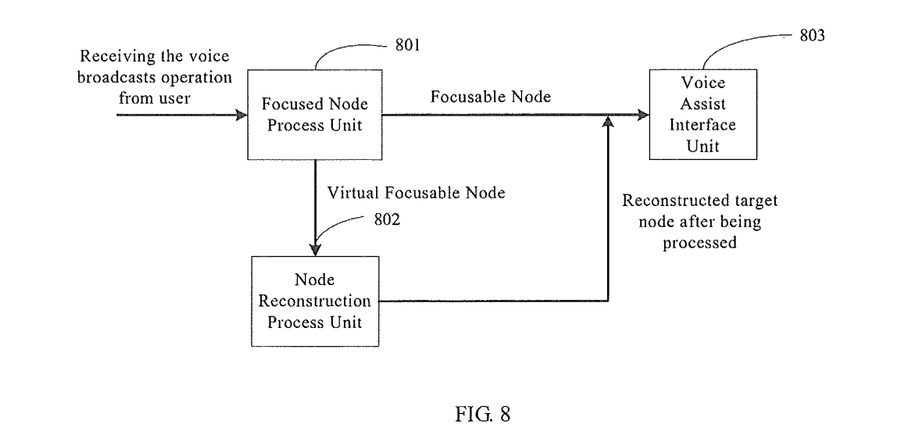
FIG. 8 is a schematic structure diagram illustrating a voice broadcast apparatus according to the sixth embodiment of the present disclosure

In the sixth embodiment of the present disclosure, the voice broadcast apparatus provided by the embodiment of the present disclosure is further described in the case where a webpage navigation method supports voice assist function in a browser. As shown in FIG. 8, the apparatus includes a focused node process unit 801 (corresponding to the receiving unit 501, the search unit 502, the determination unit 504), the node dynamical reconstruction process unit 802 (corresponding to the detection unit 505 and the reconstruction unit 506), and the voice assist interface unit 803 (corresponding the broadcast unit 503).

The focused node process unit 801 is configured to mainly search for the focusable node element supporting the voice broadcast in the DOM tree according to the focus request event input by user, directly input the focusable node to the voice assist interface unit 803 for process, and input other nodes capable of voice broadcast to the node reconstruction process unit 802 as virtual focusable nodes.

The node reconstruction process unit 802 is configured to dynamically merge or segment nodes to obtain target nodes after the reconstruction process according to the layout height of the virtual focusable node, and send the content to be broadcasted of reconstructed voice node to the voice assist interface unit 803 for process.

It should be noted that the voice assist interface unit 803 can be implemented through a voice assist interface, and combined with a voice broadcast application to implement voice broadcast.

Those skilled in the art will appreciate that embodiments of the present disclosure can be provided as a method, system, or computer program product. Accordingly, the present disclosure may take the form of a hardware embodiment, a software embodiment, or a combination of software and hardware aspects. Moreover, the present disclosure may take the form of a computer program product embodied on one or more computer-usable storage media (including but not limited to disk storage and optical storage, etc.) including computer usable program code.

The present disclosure is described with reference to flowchart illustrations and/or block diagrams of methods, apparatus (systems), and computer program products according to embodiments of the present disclosure. Each of the flows and/or blocks in the flowcharts and/or block diagrams, and combinations of the flowcharts and/or blocks in the flowcharts and/or block diagrams is understood to be implemented by computer program instructions. These computer program instructions can be provided to a processor of a general purpose computer, special purpose computer, embedded processor, or other programmable data processing device to produce a machine, enabling instructions executed by a processor of a computer or other programmable data processing device to generate equipment for implementing the functions specified in one or more blocks of a flow or in a block or blocks of a flow diagram.

The computer program instructions can also be stored in a computer readable memory that can direct a computer or other programmable data processing device to operate in a particular manner, such that the instructions stored in the computer readable memory produce manufactured product comprising the instruction device. The apparatus implements the functions specified in one or more blocks of a flow or a flow and/or block diagram of the flowchart.

These computer program instructions can also be loaded onto a computer or other programmable data processing device such that a series of operational steps are performed on a computer or other programmable device to produce computer-implemented processing for execution on a computer or other programmable device. The instructions provide steps for implementing the functions specified in one or more of the flow or in a block or blocks of a flow diagram.

The above description is only for the preferred embodiments of the present disclosure, and is not intended to limit the scope of the disclosure.

What is claimed is:

1. A voice broadcast method, comprising:
generating a voice broadcast instruction when a voice broadcast operation is received;
detecting nodes from a current focused node on a current webpage interface based on the voice broadcast instruction; and
when a target node is determined, broadcasting text content of the target node; wherein the target node has text information, has no subnode and does not respond to any operation event;
wherein, before broadcasting text content of the target node, the method further comprises:
detecting a size of content to be broadcasted of the target node; wherein the size of the content to be broadcasted includes one of followings: text length of the content to be broadcasted and layout height of the target node; and
performing corresponding node reconstruction process on the target node according to the size of the content to be broadcasted of the target node;
wherein performing the corresponding node reconstruction process on the target node according to the size of the content to be broadcasted of the target node comprises:
performing, when the size of the content to be broadcasted of the target node does not reach a first preset range, a merge process on the target node, and using the merged content to be broadcasted as the text content;
acquiring, when the size of the content to be broadcasted of the target node falls within the first preset range, the content to be broadcasted of the target node, and using the content to be broadcasted as the text content; and
performing, when the size of the content to be broadcasted of the target node exceeds the first preset range, segmentation process on the target node, and using the content to be broadcasted after the segmentation process as the text content;
wherein the performing a merge process on the target node comprises:
searching for a node to be merged of the target node sequentially from the target node, wherein the node to be merged is a sibling node of the target node having text information and having no subnode;
merging, when the node to be merged has a same element label as the target node, the target node with the node to be merged to obtain a merged node;
detecting whether a size of content to be broadcasted of the merged node reaches the first preset range; and
continuing to search, when the size of the content to be broadcasted of the merged node does not reach the first preset range, for a next node to be merged having the same element label with the target node, until the size of the content to be broadcasted of the merged node reaches the first preset range or there is no node to be merged having the same element label as the target node.

2. The method according to claim 1, wherein, before the broadcasting text content of the target node, the method further comprises:
determining, when a node does not respond to any operation event, the node is a non-focusable node;
determining, when the non-focusable node is a node element without including a subnode in a webpage document object model DOM, the node is a leaf node;
determining a text length of the leaf node; and
determining, when the text length of the leaf node is greater than a preset length threshold, the node as the target node.

3. The method according to claim 1, wherein the layout height of the target node is pixel height occupied by the content to be broadcasted of the target node in an actual webpage after layout of the actual webpage is completed.

4. A voice broadcast apparatus, comprising:
a processor; and
a memory configured to store instructions executable by the processor; wherein the processor is configured to:
generate a voice broadcast instruction when a voice broadcast operation is received;

detect nodes from a current focused node on a current webpage interface based on the voice broadcast instruction; and when a target node is determined, broadcast text content of the target node; wherein the target node has text information, has no subnode and does not respond to any operation event;

wherein, the processor is further configured to:

detect a size of content to be broadcasted of the target node; wherein the size of the content to be broadcasted includes one of followings: text length of the content to be broadcasted and layout height of the target node; and perform corresponding node reconstruction process on the target node according to the size of the content to be broadcasted of the target node;

wherein the processor configured to perform corresponding node reconstruction process on the target node according to the size of the content to be broadcasted of the target node is configured to:

perform, when the size of the content to be broadcasted of the target node does not reach a first preset range, a merge process on the target node, and using the merged content to be broadcasted as the text content;

acquire, when the size of the content to be broadcasted of the target node falls within the first preset range, the content to be broadcasted of the target node, and using the content to be broadcasted as the text content; and perform, when the size of the content to be broadcasted of the target node exceeds the first preset range, segmentation process on the target node, and using the content to be broadcasted after the segmentation process as the text content;

wherein the processor configured to perform a merge process on the target node is configured to:

search for a node to be merged of the target node sequentially from the target node, wherein the node to be merged is a sibling node of the target node having text information and having no subnode;

merge, when the node to be merged has a same element label as the target node, the target node with the node to be merged to obtain a merged node;

detect whether a size of content to be broadcasted of the merged node reaches the first preset range; and continue searching, when the size of the content to be broadcasted of the merged node does not reach the first preset range, for a next node to be merged having the same element label with the target node, until the size of the content to be broadcasted of the merged node reaches the first preset range or there is no node to be merged having the same element label as the target node.

5. The apparatus according to claim 4, wherein, the processor is further configured to:

determine, when a node does not respond to any operation event, the node is a non-focusable node;

determine, when the non-focusable node is a node element without including a subnode in a webpage document object model DOM, the node is a leaf node;

determine a text length of the leaf node; and determine, when the text length of the leaf node is greater than a preset length threshold, the node as the target node.

6. A non-transitory computer useable storage media storing one or more computer-executable instructions, wherein the one or more computer-executable instructions when executed by one or more processors cause the one or more processors to execute a voice broadcast method, the method comprising:

generating a voice broadcast instruction when a voice broadcast operation is received;

detecting nodes from a current focused node on a current webpage interface based on the voice broadcast instruction; and when a target node is determined, broadcasting text content of the target node; wherein the target node has text information, has no subnode and does not respond to any operation event;

wherein, before broadcasting text content of the target node, the method further comprises:

detecting a size of content to be broadcasted of the target node; wherein the size of the content to be broadcasted includes one of followings: text length of the content to be broadcasted and layout height of the target node; and performing corresponding node reconstruction process on the target node according to the size of the content to be broadcasted of the target node;

wherein performing the corresponding node reconstruction process on the target node according to the size of the content to be broadcasted of the target node comprises:

performing, when the size of the content to be broadcasted of the target node does not reach a first preset range, a merge process on the target node, and using the merged content to be broadcasted as the text content;

acquiring, when the size of the content to be broadcasted of the target node falls within the first preset range, the content to be broadcasted of the target node, and using the content to be broadcasted as the text content; and performing, when the size of the content to be broadcasted of the target node exceeds the first preset range, segmentation process on the target node, and using the content to be broadcasted after the segmentation process as the text content;

wherein the performing a merge process on the target node comprises:

searching for a node to be merged of the target node sequentially from the target node, wherein the node to be merged is a sibling node of the target node having text information and having no subnode;

merging, when the node to be merged has a same element label as the target node, the target node with the node to be merged to obtain a merged node;

detecting whether a size of content to be broadcasted of the merged node reaches the first preset range; and keeping searching, when the size of the content to be broadcasted of the merged node does not reach the first preset range, for a next node to be merged having the same element label with the target node, until the size of the content to be broadcasted of the merged node reaches the first preset range or there is no node to be merged having the same element label as the target node.

* * * * *